(12) United States Patent
Stanczak et al.

(10) Patent No.: US 6,631,399 B1
(45) Date of Patent: Oct. 7, 2003

(54) SYSTEM AND METHOD FOR AUTOMATED RECEIVED MESSAGE HANDLING AND DISTRIBUTION

(75) Inventors: Mark Stanczak, Chicago, IL (US); Martin T. Wegner, Barrington, IL (US); Omprasad S. Nandyal, Bloomingdale, IL (US)

(73) Assignee: Open Port Technology, Inc., Chicago, IL (US)

( * ) Notice: Subject to any disclaimer, the term of this patent is extended or adjusted under 35 U.S.C. 154(b) by 0 days.

(21) Appl. No.: 09/366,712

(22) Filed: Aug. 4, 1999

Related U.S. Application Data (63) Continuation of application No. 08/886,988, filed on Jul. 3, 1997, now Pat. No. 5,974,414.
(60) Provisional application No. 60/021,125, filed on Jul. 3, 1996.

(51) Int. Cl.[7] .............................................. G06F 13/00
(52) U.S. Cl. ...................... 709/206; 709/203; 709/217; 709/219; 379/266
(58) Field of Search ................................ 709/200, 201, 709/203, 205, 207, 217, 218, 219, 206; 379/265, 266, 309, 219

(56) References Cited

U.S. PATENT DOCUMENTS

| | | | | |
|---|---|---|---|---|
| 5,721,770 A | * | 2/1998 | Kohler | 379/266 |
| 5,825,869 A | * | 10/1998 | Brooks et al. | 379/265 |
| 5,903,641 A | * | 5/1999 | Tonisson | 379/266 |
| 5,905,793 A | * | 5/1999 | Flockhart et al. | 379/266 |
| 5,982,873 A | * | 11/1999 | Flockhart et al. | 379/266 |
| 6,044,146 A | * | 3/2000 | Gisby et al. | 379/265 |
| 6,044,355 A | * | 3/2000 | Crockett et al. | 705/8 |
| 6,130,942 A | * | 10/2000 | Stenlund | 379/265 |
| 6,134,318 A | * | 10/2000 | O'Neil | 379/266 |
| 6,157,655 A | * | 12/2000 | Shtivelman | 370/412 |
| 6,163,607 A | * | 12/2000 | Bogart et al. | 379/266 |
| 6,222,918 B1 | * | 4/2001 | De Kouchkovsky et al. | 379/265 |
| 6,222,919 B1 | * | 4/2001 | Hollatz et al. | 379/266 |
| 6,263,066 B1 | * | 7/2001 | Shtivelman et al. | 379/266 |

OTHER PUBLICATIONS

Scheduling high–volume service requets, Stein, roger, Dec., 1994.*

* cited by examiner

*Primary Examiner*—Moustafa M. Meky
(74) *Attorney, Agent, or Firm*—Shaw Pittman LLP (57) ABSTRACT

An automated message distribution system routes digitally-encoded messages via public-switched telephone networks and wide area networks and local area networks to the most desired route. In a preferred embodiment of the invention, digitally encoded messages enter into a local area network, either directly or via a public-switched telephone network, and are sent to their destinations in a distributed manner. The paths or routes are calculating by using a set of customized rules. The customized rules are set to distribute messages evenly among the available paths.

23 Claims, 6 Drawing Sheets

| MAIN QUEUE NAME | AUTOLOANS | HOMELOANS | STUDENTLOANS | REFINANCE |
|---|---|---|---|---|
| PURPOSE OF THIS QUEUE | PROCESS NEW AUTO LOANS | PROCESS NEW HOME LOANS | PROCESS NEW STUDENT LOANS | PROCESS REFINANCED HOME LOANS |
| HIGH PRIORITY QUEUE NAME | AUTOLOAN 1 | HOMELOAN 1 | STUDENT 1 | REFI 1 |
| LOW PRIORITY QUEUE NAME | AUTOLOAN 2 | HOMELOAN 2 | STUDENT 2 | REFI 2 |
| LIST OF PRIMARY USERS | ED | MARY | CHARLIE | SUE |
|  | PAT | FRED | MARK | JOE |
|  | DAVE | BILL | ROBERT | BILL |
| LIST OF SECONDARY USERS | SUE | SUE | SUE | MARY |
|  | JOE | JOE | BILL | FRED |
|  | SALLY | SALLY | FRED | SALLY |

*FIG. 6A*

| ACTUAL FIELD IN FILE | EXPLANATION OF FIELD |
|---|---|
| QUEUE NAME AUTOLOANS | NAME OF MAIN QUEUE |
| HIGH PRIORITY AUTOLOAN 1 | NAME OF HIGH PRIORITY QUEUE FOR THIS MAIN QUEUE |
| LOW PRIORITY AUTOLOAN 2 | NAME OF LOW PRIORITY QUEUE FOR THIS MAIN QUEUE |
| PRIMARY USER ED | A PRIMARY USER IN THIS MAIN QUEUE |
| PRIMARY USER PAT | A PRIMARY USER IN THIS MAIN QUEUE |
| PRIMARY USER DAVE | A PRIMARY USER IN THIS MAIN QUEUE |
| SECONDARY USER SUE | A SECONDARY USER IN THIS MAIN QUEUE |
| SECONDARY USER JOE | A SECONDARY USER IN THIS MAIN QUEUE |
| SECONDARY USER SALLY | A SECONDARY USER IN THIS MAIN QUEUE |
| OVERFLOW 10 | QUEUE OVERFLOW THRESHOLD LEVEL |
| FIRST THRESHOLD 4 | QUEUE FIRST THRESHOLD LEVEL |
| SECOND THRESHOLD 7 | QUEUE SECOND THRESHOLD LEVEL |
| BONUS VALUE 5 | BONUS VALUE FOR HIGH PRIORITY QUEUE |
| THRESHOLD MESSAGES 0 | CONTROLS OUTPUT OF MESSAGES WHEN VARIOUS THRESHOLDS HAVE BEEN REACHED |
| LOG LEVEL 2 | CONTROLS PRINTING OF DEBUGGING INFORMATION |
| SLEEP VALUE 0 | CONTROLS HOW LONG THE AFD DAEMON WILL WAIT BETWEEN MAIN LOOPS. |
| QUEUE NAME HOMELOANS | NAME OF ANOTHER MAIN QUEUE, THE OTHER DATA IS SIMILAR TO FIRST QUEUE |
| HIGH PRIORITY HOMELOAN 1 | |
| LOW PRIORITY HOMELOAN 2 | |
| PRIMARY USER MARY | |
| PRIMARY USER FRED | |
| PRIMARY USER BILL | |
| SECONDARY USER SUE | |
| SECONDARY USER JOE | |
| SECONDARY USER SALLY | |
| OVERFLOW 10 | |
| FIRST THRESHOLD 4 | |
| SECOND THRESHOLD 7 | |
| HIGH PRIORITY BONUS 10 | |
| QUEUE NAME STUDENTLOANS | NAME OF ANOTHER MAIN QUEUE, THE OTHER DATA IS SIMILAR TO FIRST QUEUE |
| HIGH PRIORITY STUDENT 1 | |
| LOW PRIORITY STUDENT 2 | |
| PRIMARY USER CHARLIE | |
| PRIMARY USER MARK | |
| PRIMARY USER ROBERT | |
| SECONDARY USER SUE | |
| SECONDARY USER BILL | |
| SECONDARY USER FRED | |
| OVERFLOW 10 | |
| FIRST THRESHOLD 4 | |
| SECOND THRESHOLD 7 | |
| HIGH PRIORITY BONUS 10 | |
| ...(REPEAT FOR ADDITIONAL QUEUES) | |

*FIG. 6B*

SYSTEM AND METHOD FOR AUTOMATED RECEIVED MESSAGE HANDLING AND DISTRIBUTION

This application is a continuation of U.S. application Ser. No. 08/886,988, filed Jul. 3, 1997 (now U.S. Pat. No. 5,974,414), hereby incorporated by reference herein in its entirety, which application claims the benefit of U.S. Provisional Application Ser. No. 60/021,125, filed Jul. 3, 1996.

BACKGROUND

1. Field of the Invention

The present invention relates to message distribution in public and private networks. More particularly, the present invention is a system and method for optimally routing messages received over public and private networks to an appropriate message receiving subsystem or person.

2. Background of the Invention

Generally, a message distribution system distributes information in the form of one or more messages from a message sender to a message receiver. The message sender combines data representing the information content of the messages into a form that can be transmitted to the message receiver. A variety of communication media exist over which messages can be transmitted, including telephone, wireless communication systems and computer networks. There are several conventional message distribution systems currently in use for delivering messages from a message sender to a message receiver.

One conventional message processing system is a point-to-point message distribution system. Point-to point distribution systems distribute messages by establishing a direct path between a message sender and a message receiver. An example of a point-to-point distribution system is in an automated message routing (AMR) stem.

Figure 1:
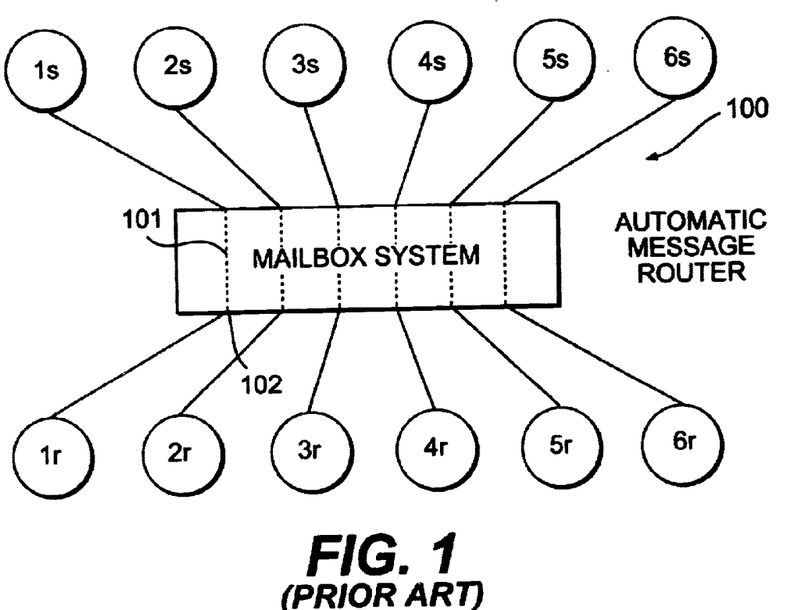
FIG. 1 is a schematic of a prior art AMR system.

FIG. 1 illustrates schematically an AMR system 100. In the AMR system 100, a message sender 1s sends a message to a message receiver 1r along a direct path 101. The message receiver 1r is located at logical address 102. Both the message recipient 1r and the route through which the AMR system 100 delivers the message are predetermined by the respective addresses of the message sender 1s and the message receiver 1r. Common forms of addresses for the message sender 1s and the message receiver 1r include a dialed telephone number and an identified mailbox address. The AMR system 100 is limited, however, because it does not select the route over which to transmit a message. Rather, the particular route is determined solely by the respective addresses of the message sender and the message receiver.

Figure 2:
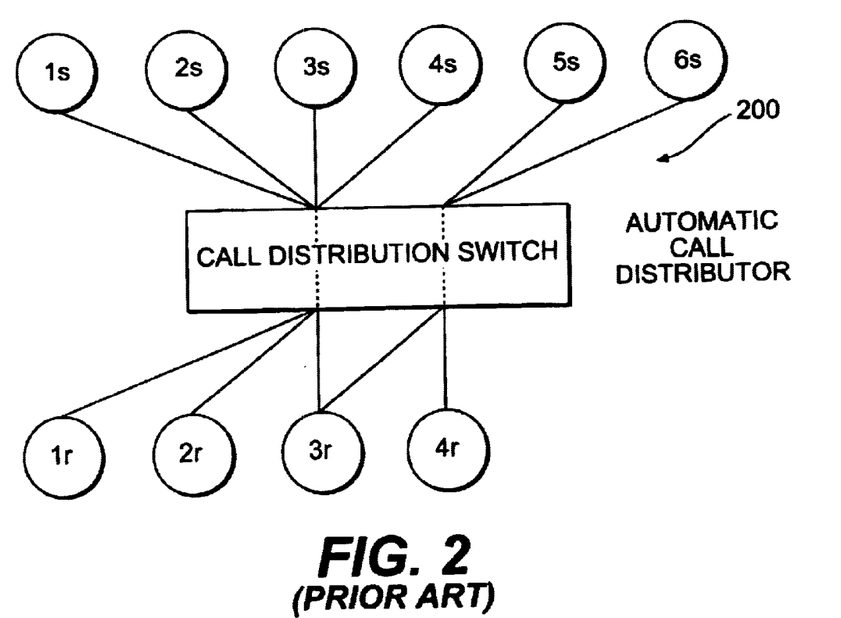
FIG. 2 is a schematic of a prior art ACD system.

A second conventional message processing system is used in telephone call distribution systems. FIG. 2 is a schematic diagram of an automated call distribution (ACD) system 200 for distributing telephone calls received by the ACD system 200. In the ACD system 200, the only information that is known about the telephone call at the time the telephone call is answered is the type of information that will be discussed during the call (e.g., the caller dials a number for customer service for a particular product line), the identification of the caller (e.g., the caller's telephony system identifier), or both. Such systems are limited because the information content of a telephone call is unknown at the time of call receipt by the ACD system 200. Thus, such content cannot be used in the routing process. As a result, information based on the content of the message, the telephone call, cannot be used to determine the ultimate receiver of the call.

A third conventional message processing system is an automated message distribution (AMD) system. Conventional AMD systems place inbound messages in one or more general-purpose mailboxes that correspond to known pieces of information. In an AMD system, the only information known prior to receipt of the message is similar to that of the ACD system described above, i.e., type of information to be discussed and caller identification data. However, because the information is in a message format, rather than a telephone call, the rules for message distribution in an AMD system can differ substantially from those for distributing calls in an ACD system. For example, conventional content processing mechanisms, including mail header parsers, addressing parsers, and optical mark recognition (OMR) and optical character recognition (OCR), can add further information to the routing decision.

Figure 3:
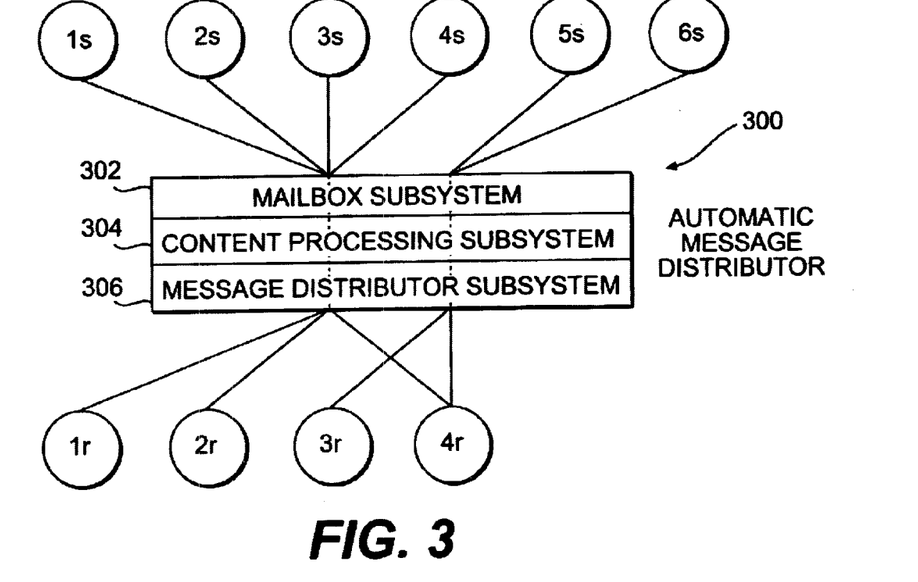
FIG. 3 is a schematic of a prior art AMD system.

FIG. 3 illustrates schematically a conventional AMD system 300 for message distribution. The AMD system 300 has a mailbox subsystem 302, a content processing subsystem 304 and a message distributor subsystem 306. The mailbox subsystem 304 receives a message from a message sender 1s–6s. The message is received in message format and stored in the mailbox subsystem 302. The content processing subsystem 304 then derives information from a message stored in the mailbox subsystem 302. This information can be passed to the message distributor subsystem 306 to help distribute the message to an appropriate message receiver 1r–4r. However, the information stored in conventional mailbox-based AMD systems is not sufficient to determine optimal routing of the mailbox messages to an appropriate message receiver. This is because no information regarding the priority of the message, the amount of time the message has been in the mailbox subsystem 302, nor the status of the mailbox subsystem 302 potential recipients is monitored in the conventional mailbox system.

SUMMARY OF THE INVENTION

The present invention is an AMD system that is optimized for distributing digitally-encoded messages (DEMs) received from a number of sources through a computer network and initially stored in one or more distributed message queues (DMQs). The DEMs can be received from a database, over a LAN or WAN or other communication media. Using the present invention, message distribution is optimized according to a set of configurable distribution rules. The message can assume one of a number of manipulatable forms. For example, in the case of facsimile (fax) data, messages can be stored in one of the TIFF, PCX or DCX formats.

Unlike conventional AMD systems described above, neither the message receiver's identity nor the route by which the message should be distributed is predetermined. The AMD of the present invention processes information that is received in message format rather than as a telephone call, and therefore can base routing decisions on message content. Message content information is not available to conventional ACD systems as described above.

The present invention uses a distribution rule table (DRT) in which a set of configurable distribution rules are stored. The distribution rules determine various information regarding the AMD system. Using this information, the message distributor of the present AMD system can route received messages to appropriate message recipients in an optional manner. For example, it may be desirable to evenly distribute messages to available message recipients. In this case, the distribution rules in the table would be chosen such to effectuate even distribution of messages to message recipients.

The DRT operates in conjunction with a resource information table (RIT). The RIT maintains information corresponding to the availability of resources that are able to process DEMs that are stored in the DMQs. Thus, the present invention uses the DRT in conjunction with the RIT to optimally route incoming DEMs that are initially stored in the DMQs to resources that are able to process the DEMs.

The AMD system of the present invention receives and stores messages in a variety of formats. Because the messages are stored, the present invention can extract content information from the messages for routing purposes that is not available to conventional AMD or ACD systems. Moreover, the store-and-forward capability of the AMD system enables the present invention to monitor a resource load (RL) containing message processing resources to determine optimal message distribution. The AMD system uses any extracted information to automatically route the received messages to an appropriate message receiver for subsequent processing. In addition, the present invention uses an input message router (IMR) as a pre-processor to determine in which DMQ of a multiple-DMQ system each incoming DEM should initially be stored. For example, a type of transaction, when submitted as a fax, can be determined by any of a number of image-to-text conversion techniques applied to a cover sheet of a fax DEM. Such image-to-text conversion techniques include optical mark recognition (OMR), optical character recognition (OCR), and handwriting recognition. The AMD system can use the transaction information to route the DEM to an appropriate DMQ in the message distributor. The message distributor applies a set of distribution rules to the messages in the queue to optimally distribute the messages to message receivers for subsequent processing.

The AMD system of the present invention is described in greater detail in the detailed description of the invention, the appended drawings, and the attached claims.

BRIEF DESCRIPTION OF THE DRAWINGS

FIG. 6B is a partial configuration file corresponding to the configuration illustrated in FIG. 6A.

DETAILED DESCRIPTION OF THE PREFERRED EMBODIMENTS

The three systems discussed above (AMR system 100, ACD system 200, and AMD system 300) can be differentiated on the basis of system performance measure-of-success criteria. The measure-of-success criteria for each of the 3 systems is as follows:

1. AMR System 100—percentage of messages that are automatically routed to the correctly identified recipient;

2. ACD System 200—(a) average time difference from the point at which the incoming phone call is first detected, to the point at which a suitable respondent answers the call, and (b) how quickly and accurately the response is given, such that the caller is satisfied with the response; and 3. AMD System 300—automatic, correct forwarding of a message to a suitable respondent within a reasonable time period.

In the AMD system 300, identification of the group of suitable respondents can be more critical than the time difference from receipt of message to response. This identification is simplified because a received message is stored and subsequently forwarded to a recipient. As a result, the content of the message can be processed to provide additional information regarding the identity of a group of suitable respondents. Thus, a primary goal of the present invention is to determine a group of suitable respondents and distribute (route) the received messages to that group of respondents in an optimal manner.

The present invention provides a mechanism whereby an operator can optimize the distribution of transmitted messages to appropriate receivers in an AMD system. Preferably, the messages are digitally-encoded messages (DEMs). As used herein the term "message" includes any digitally-encoded information that can be transmitted by a sender to a receiver.

The preferred embodiment of the present invention implements a distribution rule table that contains rules to control the distribution of messages. The rules in the distribution rule table can be optimized to achieve any desired distribution effect by a system administrator or operator. Providing a configurable distribution rule table enables a system administrator or operator to optimize message distribution for a particular configuration or to meet particular and varying system requirements. For example, in a preferred embodiment of the present invention, a system administrator or operator optimizes distribution of messages received from multiple inputs by configuring the distribution rule table to evenly distribute the received messages to eligible message recipients.

Figure 4:
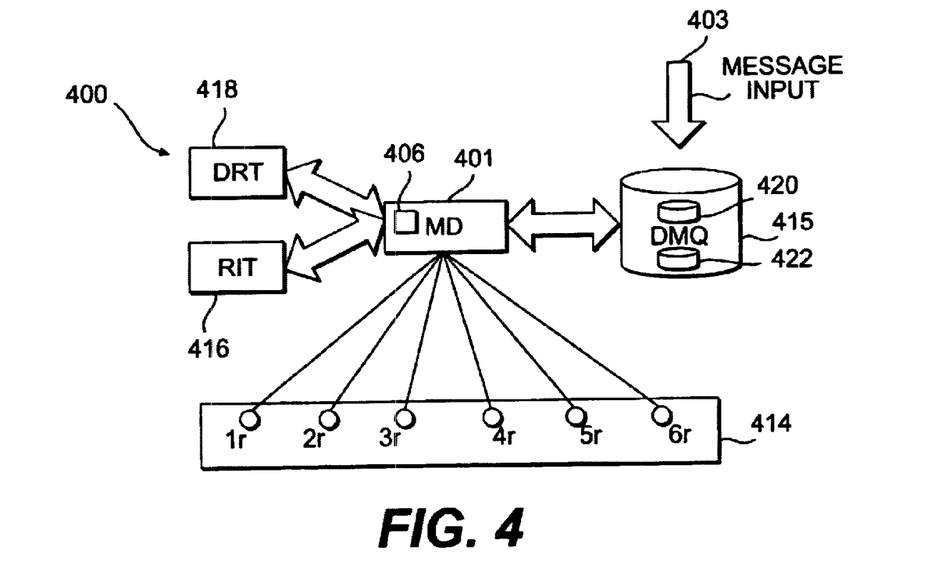
FIG. 4 is a schematic of an AMD system according to a preferred embodiment of the present invention.

FIG. 4 illustrates schematically an AMD system 400 having a message distributor (MD) 401 that distributes messages according to the present invention. The MD 401 is operatively connected to a decision routing table (DRT) 418, a resource information table (RIT) 416 and a distributed message queue (DMQ) 415. As used herein, operatively connected includes the possibility that one end of the connection is a part of, or included in, the other end of the connection. For example, the DRT 418 can be a table stored in the MD 401.

The AMD system 400 also has a set of message receivers 1r–6r. Collectively, the set of message receivers 1r–6r is referred to as a resource load (RL) 414. The RL 414 contains the resources that process DEMs that have been stored in the DMQ 415. In FIG. 4, for example, the resource load 414 contains the message receivers 1r–6r that ultimately process the DEMs.

Information regarding the resources in the RL 414 is stored in the RIT 416. The RIT 416 is a resource information maintenance and access process which preferably maintains a table of all current routing options. In the preferred embodiment of the present invention, the table maintained by the RIT 416 is a dynamic table which is updated to track dynamic connection and disconnection of routing options (paths). For example, the RIT 416 maintains a list of the resources that are logged into the AMD system 400. The RIT 416 also stores the status of each connection path contained therein For example, a path may be connected but not ready to receive a message. This occurs when a DEM has been forwarded to a particular resource 1r–6r, but not yet processed by the particular resource 1r–6r. In the preferred embodiment only one new DEM will be transmitted to a particular resource. Therefore the resource may be connected but unavailable because it has a new DEM.

The DMQ 415 initially stores the received DEMs 403 so that they may be optimally forwarded to resources in the RL 414. The DMQ 415 also contains information related to the incoming DEMs 403.

There are three types of queues in the preferred embodiment of the present invention, main queues, high-priority queues and low-priority queues. Preferably the queues are related to one another such that the main queue logically contains a high-priority queue and a low-priority queue. For example, referring to FIG. 4, the DMQ 415 is a main queue that logically contains a high-priority queue 420 and a low-priority queue 422. In alternate embodiments of the present invention, there can be multiple levels of priority queues in addition to the high and low-priority queues. The additional priority-level queues provide increased flexibility in message classification. As described below, each of the additional priority-level queues can be named.

Each of the three types of queues can be named. The name is preferably chosen to indicate the purpose of the queue. For example, if the purpose of the main queue is to store DEMs related to auto loans, then the main queue might be named "autoloans," the high-priority queue named "autoloans1" and the low-priority queue named "autoloans2."

In the preferred embodiment, two general classes of users can be assigned to a main queue, primary users and secondary users. Primary users are those that have an expertise in handling matters contained in the DEMs that will be assigned to the main queue. Thus, primary users can be considered specialists in a particular area. Secondary users are those who can process the messages stored in the main queue, but only in the event that there are no primary users available. This can occur when, for example, there are so many DEMs entering the main queue that the primary users cannot process all the DEMS, which results in DEMs backing up in the DMQ. DEMs can be routed to secondary users to minimize the impact that the backup will have on DEM processing. Thus, secondary users function as a back up to handle DEMs stored in the main queue when there is no primary user available.

It would be apparent to those skilled in the art that any number of user classes can be established to fit the needs of a particular implementation of the present invention. For example, a particular implementation of the present invention might have primary, secondary, tertiary, etc. classes of users. Further, those users may be distributed over any number of queues.

Each user class has a corresponding user list associated with it. The user list corresponding to a particular class contains entries for each user that is a member of the particular user class. For example, all of the primary users have entries in the user list corresponding to the primary users. This user list can be termed the primary user list. Likewise, any users that have been designated as secondary users of a particular queue have corresponding entries in a secondary users list. A user list for any user class can be empty. The effect of empty users lists is to cause overflow condition threshold limits (described below) to be reached more quickly. For example if the secondary user list is empty, then the second threshold is reached immediately upon the number of DEMs in the DMQ exceeding the first threshold.

Distribution of the DEMs from the main queue to resources in the resource load is a function of the control of the high- and low-priority queues. In the preferred embodiment, such control is performed by a queue controller executing in the message distributor 401, referred to herein as an "AMD daemon" 406. A daemon is a well-known term in the computer field for a process that is started when a system is bootstrapped and terminates only when the system is shutdown. Daemons are generally considered to run in the background because they have no controlling terminal. It would be apparent to those skilled in the art that other mechanisms can used for implementing the queue controller to perform the functions described herein. Using the DMQ 415 as the main queue, AMD daemon 406 control of the interaction of the high- and low-priority queues according to a preferred embodiment of the invention is explained with reference to FIG. 4.

Each DEM stored in the DMQ 415 has an age associated with it. Preferably a DEM begins to age upon being stored in the DMQ 415. The age of any particular DEM stored in the DMQ 415 is substantially equal to the time the DEM arrived in the DMQ 415 subtracted from the current time. As used herein, the term "current time" refers to the time at which the age calculation is performed. Other measurements of age can be made. For example, the time the DEM entered the AMD system 400 subtracted from the current time can be used as the age of a particular message.

The age of each DEM stored in the high-priority queue 420 has a "bonus" value added to it. The effect of adding the bonus value to the age of a DEM is to make the DEM appear to be older than it actually is. The bonus value is described in more detail below. Because one of the parameters determining when a DEM is distributed is its age in the preferred embodiment, adding the bonus value only to DEMs in the high-priority queue 420 gives DEMs stored in the high-priority queue 420 a higher priority than those stored it the low-priority queue. Considerations for choosing a bonus value are presented below.

In an embodiment of the present invention having priority queues in addition to the high and low-priority queues, a separate bonus value corresponding to a particular priority queue can be assigned for the messages stored in the particular priority queue. Thus, a particular implementation of the present invention can have a multiplicity of priority queues, and a bonus value assigned to each message in a particular queue.

In addition to the high- and low-priority queue designation, each DEM stored in the DMQ 415 has a priority flag. In the preferred embodiment, the priority flag is set to 0 for a low-priority DEM, and set to 1 for a high-priority DEM. Preferably, DEMs have their priority flag set to 0, indicating low priority, by default. In the preferred embodiment, users can raise or lower the priority level of a DEM by setting its priority flag to 1 or 0, respectively. It should be noted that the value of the priority flag can assume multiple values to indicate multiple priority levels. Providing a multiplicity of priority levels allows more flexible sorting of messages according to those priority levels (described below).

In operation, the AMD daemon 406 creates a list of all DEMs that are stored in the DMQ 415. The AMD daemon 406 then sorts the list in descending order according to each DEM's adjusted age. A DEM's adjusted age is its real age adjusted by any bonus value. The AMD daemon 406 performs a second pass through the list to move any DEMs that have a priority flag set to 1 to the top of the list. The order by adjusted age will be maintained for the group of DEMs that have a priority flag value of 1 and those that have a priority flag value of 0.

In an implementation of the present invention having multiple priority levels, DEMs are sorted initially according to priority flag value to form a plurality of priority groupings. Then, the DEMs are sorted according to adjusted age within each priority grouping. In an alternative embodiment, each priority level is assigned a different bonus value. In the alternative embodiments, priority level sorting is not absolute. Rather, sorting can be based on bonus-adjusted age values where priority level is simply one input to those values.

The AMD daemon 406 also keeps track of the available resources in the resource load 414. An available resource is one to which a DEM can be sent. According to a preferred embodiment of the present invention, DEMs can only be sent to inactive users. Inactive users are those that have a connection and have no DEMs in their input box. As with the DEMs in the DMQ 415, the AMD daemon 406 maintains a sorted list of the available resources in the RIT 416 (described below). Preferably the sorting criterion is inactive time, such that users that have been inactive longest are the first to receive DEMs.

In the preferred embodiment the bonus value is predetermined by a system administrator or operator. Once set, the bonus value is stored in a configuration file (described below). The bonus value represents the maximum amount of time that a DEM stored in a low-priority queue can be preempted by a DEM stored in a high-priority queue. For example, if the bonus value is set to 10 and a low-priority DEM has aged for 8 minutes, the low-priority DEM could still be preempted for another 2 minutes. This means that newly arriving DEMs in the high-priority queue are delivered more quickly than DEMs that have been waiting in the low-priority queue for less than 10 minutes.

The following factors can be considered when determining a bonus value:

1) Length of time that is acceptable for low-priority DEMs to wait—The longer that low-priority DEMs can wait, the higher the bonus value can be set. If, however, it is desirable to have no DEM wait a long time, then the bonus value should be set to a value less than the maximum time that a DEM can wait.

2) Volume of high-priority DEMs—If there is a low volume of high-priority DEMs, the effect of the bonus value is less significant. This is because high-priority DEMs will arrive and be quickly delivered, ahead of any low-priority DEMs. The arrival of new high-priority DEMs will temporarily preempt delivery of low-priority DEMs. However, because of the low volume of high-priority DEMs, low-priority DEMs will be serviced quickly, after the high-priority DEMs have been delivered. Note that the converse is also true. That is, if there is a heavy volume of high-priority DEMs, the high-priority, DEMs will preempt the low-priority DEMs for a longer time. Thus, the bonus value is more significant when there is a high volume of high-priority DEMs.

3) Volume of low-priority DEMs—If there is a high volume of low-priority DEMs and it is desirable to have high-priority DEMs serviced quickly, then the bonus value should be set relatively high. This is because the heavy low-priority DEM volume could cause a large number of DEMs to age beyond the bonus age value. Upon doing so, the low-priority DEMs attain the same priority as newly arriving high-priority DEMs. Setting the bonus value higher delays the time when the low-priority queue DEMs reach the same priority as the high-priority DEMs.

4) High-priority flag versus high-priority queue—In the preferred embodiment, DEMs with a high-priority flag always take priority and get delivered first. That is, the high-priority flag has different meaning than the high-priority queue. In an alternative embodiment of the present invention, a DEM can age sufficiently to be delivered prior to a DEM that has a set high-priority flag.

The AMD system 400 also allows one or more queue depth thresholds to be set. A queue depth threshold is a value that is stored in the system configuration file. The value corresponds to the number of DEMs that are stored in the DMQ 415. The AMD daemon 406 will take various actions if the number of DEMs stored in the DMQ 415 reaches and/or exceeds any queue depth threshold.

There are three queue depth thresholds in the preferred embodiment. The first. threshold is a warning threshold, which informs the AMD daemon 406 that DEMs are backing up in the DMQ 415. The second threshold informs the system that the users currently processing DEMs in the DMQ 415 are unable to keep up with the current DEM volume of DEM traffic. The third threshold is an overflow threshold that informs the AMD daemon 406 that the current DEM volume is too large for the current set of primary and secondary users to process.

In the preferred embodiment, the thresholds are set by assigning threshold values corresponding to each desired threshold in the configuration file. Considerations in determining appropriate thresholds include the time at which the system experiences peak DEM volume, the size of the peak volume of DEM traffic and how many DEMs can be stored in the DMQ 415 prior to allowing secondary users to process the DEMs.

The number of DEMs in the DMQ 415 can be maintained by the message distributor using a storage register. Initially, the valve stored in the storage register is set to the value zero, indicating that no DEMs are stored in the DMQ 415. When a message enters the AMD 400 and is subsequently stored as a DEM in the DMQ 415, the value stored in the storage register is incremented by one. When a DEM is distributed to a resource in the RL 414, the value stored in the storage register is decremented by one. In this way, the storage register maintains a continuous count of the number of DEMs in the DMQ 415.

If the number of DEMs in the DMQ 415 reaches the warning threshold, a message indicative of this condition is written to a system log file and/or printed on a system printer. The message indicates that the DEM traffic is sufficient to cause a backlog of DEMs. If the number of DEMs reaches the second threshold, the eligible user list is augmented by adding secondary users for the DMQ 415 to handle the overflow of DEMs in the DMQ 415. If the number of DEMs stored in the DMQ 415 reaches the overflow threshold, then a message indicative of this condition is written to a system log file and/or a system printer. An overflow condition indicates that the number of DEMs entering the AMD system 400 is too great to be handled by the primary and secondary users currently assigned to process the incoming messages. It would be apparent to those skilled in the art that other actions are possible upon reaching and/or exceeding a particular threshold value. For example, messages can be moved from one queue to another (less busy queue) either manually or automatically, when a particular threshold is reached.

Although there are three thresholds in the preferred embodiment of the present invention, any number of thresholds, including no thresholds, can be used in a particular implementation of the present invention. Each threshold provides an additional warning of a queue overflow condition. An action can be defined for each threshold. The action is taken when the numbers of DEMs stored in a particular queue reaches or exceeds the particular threshold for which it is defined. In an embodiment using no thresholds, there is no warning of a queue overflow condition.

The RIT 416 maintains a list of the status of the resources 1r–6r in the RL 414. In the preferred embodiment, the resources are users or workstations that are capable of processing the DEMs stored in the DMQ 415. As used herein, the term "users" includes agents that can process DEMs stored in the DMQ 415. In the preferred embodiment, the AMD daemon 406 creates the RIT 416 by accessing an "active user" database. The active user database maintains a list of which users are logged into the AMD system 400.

A user has a status of busy if the user has one new DEM in his or her input box. A user has a status of inactive if the user has a connection, but has no new DEMs in his or her input box. Preferably the input box is a mailbox, although it would be apparent to those skilled in the art that any means of storing DEMs and notifying the user that DEMs are available for processing can be used. In the preferred embodiment, the RIT 416 determines and keeps track of the amount of time each logged in user has been inactive. As described below, this information is used to determine which user will receive the next DEM.

In the preferred embodiment, a DEM_PRESENT flag, associated with each user, is set to indicate that a particular user has a new DEM to process. Thus, to determine whether a particular user has a new DEM to process, the AMD daemon 406 polls the DEM_PRESENT flag associated with that particular user to determine if the flag is set. In the preferred embodiment, the DEM_PRESENT flag is implemented as a field in a "view" database. As used herein the "view" database is equivalent to the DMQ 415. It would be apparent to those skilled in the art that a database separate from the DMQ 415 could be used to maintain information related to the DEMs stored in the DMQ 415. The DEM_PRESENT flag for DEMs that need to be distributed for processing is set equal to the name of the DMQ 415. When a DEM is distributed for processing, the DEM_PRESENT flag is set equal to the name of the user to which the DEM is distributed. Thus, DEMs that are stored in the DMQ 415, and therefore require distribution, can be identified by polling the DEM_PRESENT flag to determine if the value of the DEM_PRESENT flag equals the name of the DMQ 415.

A user can log out of the AMD system 400 if the user desires not to receive new DEMS. Alternately, the user can click on a stop button to indicate that the user desires not to receive new DEMS, and end his or her connection. When a user logs out of the AMD system 400, that user's new DEMs are absorbed to the front of the DMQ 415 for subsequent distribution to available users.

The DRT 418 is a distribution rule maintenance and application process that maintains a set of routing rules that control the distribution of DEMs that enter the AMD system 400 and are stored in the DMQ 415 to the resources 1r–6r in the RL 414. The DRT 418 also contains routing information required to perform routing, including the users assigned to the DMQ 415, special priority values and queue threshold values. In the preferred embodiment, the DRT 418 maintains a distributed routing table to store the routing information.

The routing rules of the preferred embodiment are described with reference to the flowchart in FIG. 4A. The AMD daemon 406 begins routing determination in the start step 450, whereupon it immediately proceeds to step 452. In step 452, the AMD daemon 406 compiles a list of available agents by accessing the active user database. This list is stored in the RIT 416 as described above. The AMD daemon 406 then determines the number of DEMs that are stored in the DMQ 415. If that number is less than the second threshold (indicating that the queue is not backing up significantly), then the AMD daemon 406 continues in step 456, in which it creates and stores a list of primary users of the DMQ 415. Otherwise DEMs in the queue are backing up and secondary users can aid in DEM processing. In that case, the AMD daemon 406 continues in step 458 where it creates and stores a list of primary and secondary users of the DMQ 415.

The AMD daemon 406 continues processing in step 460 where it compares the list that it created in either step 456 or step 458 with the list of users logged into the system that is maintained in the RIT 416. Any intersections, i.e., matches, indicate that users are available to process the DEM. If there are no available users, i.e., no matches, the AMD daemon 406 "sleeps." Sleeping means that the AMD daemon 406 waits some amount of time prior to repeating the process illustrated in the flowchart of FIG. 4A, beginning at step 452. In the preferred embodiment, the amount of sleep time is predetermined by a system administrator or operator and stored in the system configuration file.

If there is an available agent, the AMD daemon 406 selects the agent with the longest idle time, i.e., the agent that has been inactive the longest. The AMD daemon 406 polls the RIT 416, which contains this information as described above. The AMD daemon 406 then completes its processing in step 468. By distributing the next highest aged DEM to the longest inactive agent, the AMD daemon 406 achieves one of the goals of the present invention to evenly distribute DEMs to the resources in the resource load 414.

Figure 4A:
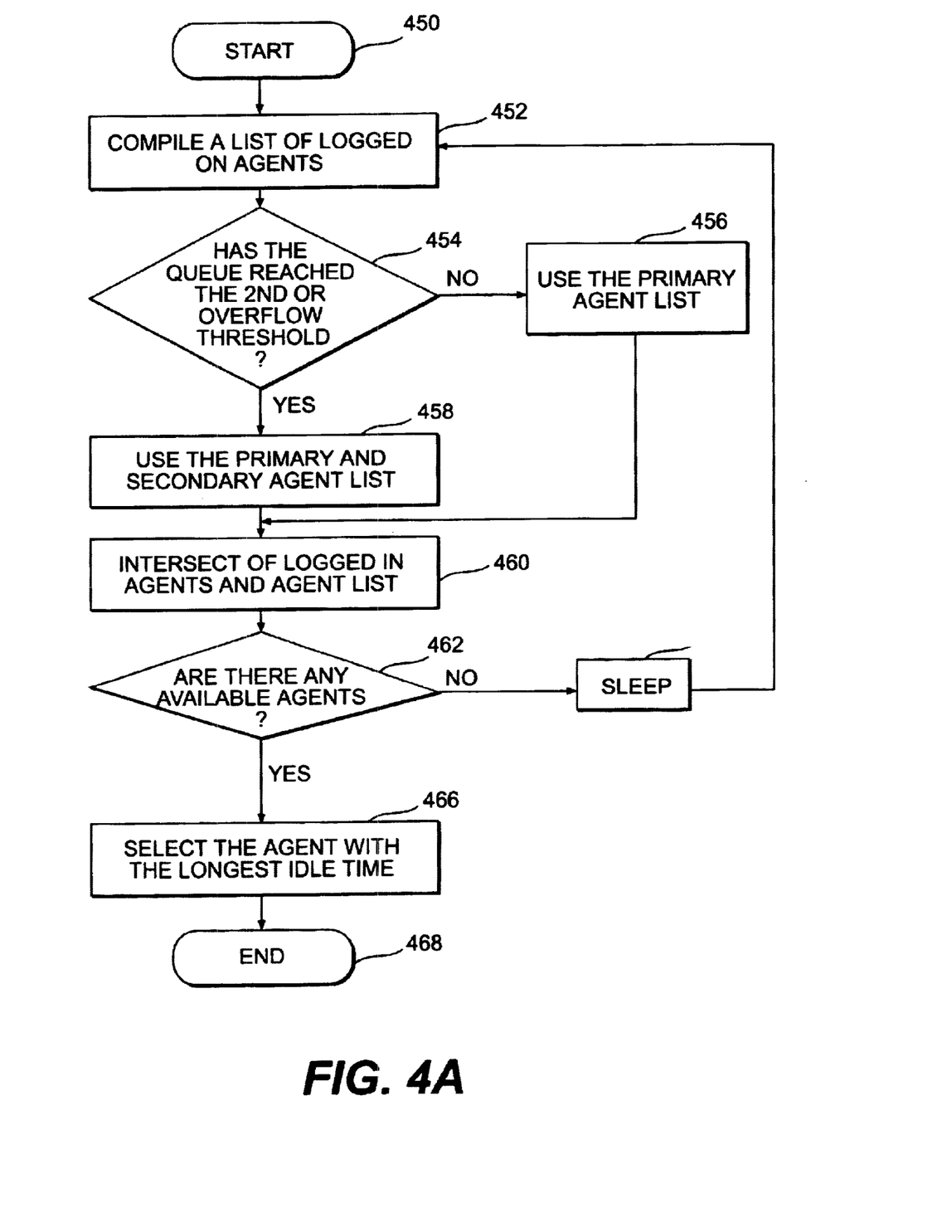
FIG. 4A is a flow chart representing a process for distributing digitally-encoded messages according to a preferred embodiment of the present invention.

The process represented by the flowchart in FIG. 4A can be invoked in a number of ways. For example, the receipt of a DEM by the AMD system 400 can trigger execution of the process. That is, the triggering mechanism for executing the process is receipt of a new DEM. Other ways for invoking the process are within the knowledge of those skilled in the art. For example; the process can be repeated continuously. A step that determines whether the DMQ 415 is empty is added prior to step 452 for continuous repetition. If the DMQ 415 is empty, the process waits some amount of time (defined by the "sleep" field in the system configuration file), and then checks the DMQ 415 status again. If, however, the DMQ 415 is not empty, processing continues in step 452.

Figure 5:
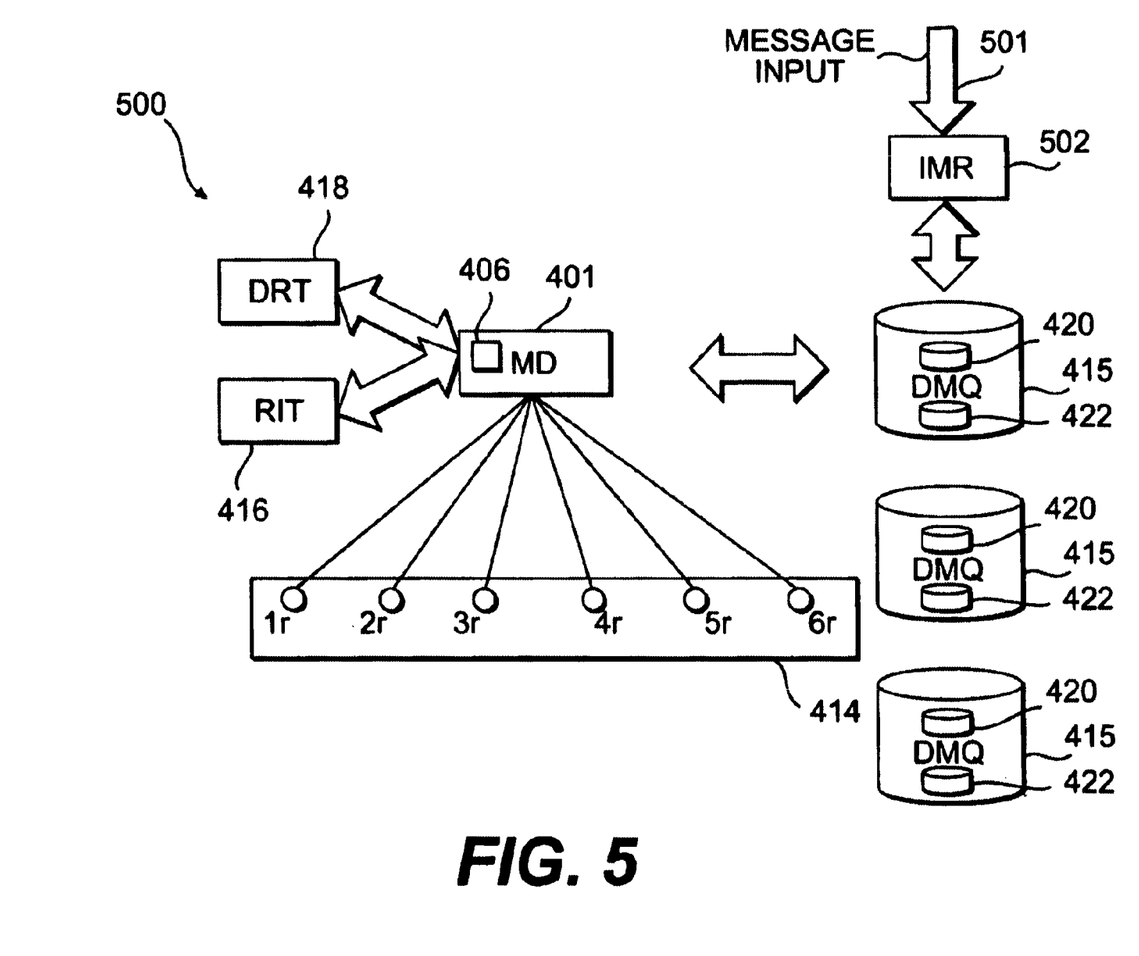
FIG. 5 is a schematic of an AMD system according to a preferred embodiment of the present invention having multiple DMQs and an IMR.

FIG. 5 illustrates schematically an AMD system 500 according to a second preferred embodiment of the present invention. The AMD system 500 differs from the AMD system 400 in two primary respects. First, the AMD system 500 includes multiple DMQs 415. Second, the AMD system 500 includes an input message router (IMR) 502.

Each DMQ 415 in the AMD system 500 is a main queue which includes a high-priority queue 420 and a low-priority queue 422. Thus, the DMQs 415 used in the AMD system 500 are similar to those used in the AMD system 400. Each DMQ 415 can be independently named. As described above, each name is generally chosen to indicate the purpose of the particular DMQ 415 to which it refers. Further, each DMQ 415 can have its own set of primary and secondary users, thresholds, sleep times, bonus values, and it own high- and low-priority queues. In the preferred embodiment, this information is stored in a single system configuration file. It would be apparent to those skilled in the art that the configuration information can be stored in multiple configuration files, for example one file per DMQ 415. Further, the architecture of the present invention is sufficiently flexible to implement additional priority queues, bonus values, thresholds, sleep times and lists of multiple user classes, as described above for each of the multiple DMQs 415.

In addition, users can be placed in multiple queues. Thus a primary user in a first DMQ 415 can be listed as a secondary user in a second DMQ 415. Similarly, a secondary user in a first DMQ 415 can be listed as a secondary user in a second DMQ 415. Also, a primary user in a first DMQ 415 can be listed as a primary user in a second DMQ 415. As is readily observed, numerous configurations are possible given the architecture of the AMD system 500.

Figure 6A:
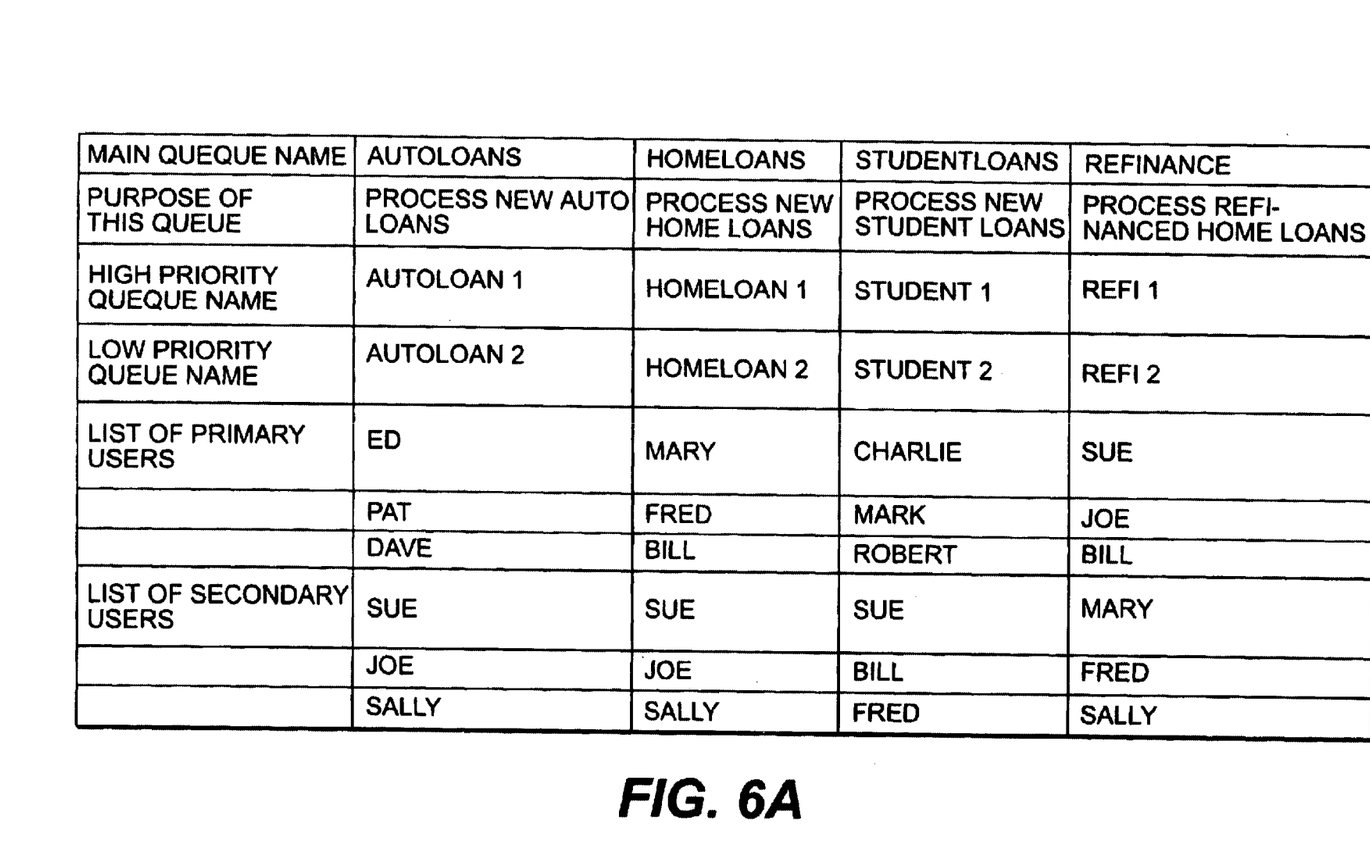
FIG. 6A is a tabular representation of a queue configuration according to a preferred embodiment of the present invention.

An example of a queue configuration for a financing center is illustrated in FIG. 6A. A portion of a corresponding configuration file is illustrated in FIG. 6B. Referring to FIGS. 6A and 6B, four queues are illustrated. The queues are named "autoloans", "homeloans," "studentloans" and "refinance." The purpose of each of the queues is given in the figure as are the names of the high-and low-priority queues. Note that the names of the queues are preferably chosen to closely correspond to the purpose of the queues.

Some additional comments are provided to help explain the figures. Ed, Pat and Dave only process auto loans. They are therefore listed as primary users of the "autoloans" queue, and not listed as secondary users of any queue. Mary and Fred are home loan specialists. Mary and Fred also know how to process home loan refinances. They are therefore listed as primary users of the "homeloans" queue and secondary users of the "refinance" queue to help process home loan refinances should the "refinance" queue back up. Charlie, Mark and Robert only process student loans. They are therefore listed only as primary users of the "student loans" queue. Sue is a refinance specialist, but she also has years of experience processing other forms of loans. She is therefore listed as a primary user of the "refinancing" queue, and a secondary user of the "autoloans," "homeloans" and "studentloans" queues. Joe is similar to Sally, but has more experience with refinancing. Therefore, Joe appears as a primary user in the "refinance" queue, whereas Sally is a secondary user. Bill specializes in home and refinance loans. He is therefore listed as a primary user in the "homeloans" and "refinancing" queues. Because he has sufficient knowledge of student loan processing, he is listed as a secondary user of the "studentloans" queue.

Note that FIG. 6B is a portion of the configuration file that corresponds to the queue configuration of FIG. 6A. The configuration file illustrates the fields required to describe the "autoloans," "studentloans": and "homeloans" main queues of FIG. 6A. It would be apparent to those skilled in the art how to complete the configuration file illustrated in FIG. 6B to include the "refinance" main queue or to extend the configuration file to include other queues. Note that at least one primary user is required for each main queue. There can be any number of additional primary users. There can be any number of secondary users, including no secondary users. Default values for the various parameters (including threshold, bonus values, sleep time, etc.) can be set by a system administrator or operator.

When determining how to distribute DEMs to available agents, the AMD system 500 executes the process described with respect to FIG. 4A with several exceptions. The process is repeated for each DMQ 415 in the AMD system 500. In the preferred embodiment, the AMD daemon 406 executes the process by cycling through the DMQs 415. That is, the process is run, once through for the first DMQ 415, then the next DMQ 415, and so on. As the AMD daemon 406 moves between the DMQs 415, the list of users available to process DEMs for that particular queue is updated. When all of the DMQs 415 have been processed, the AMD daemon 406 repeats the cycle for the DMQs 415.

Other processing paradigms would be apparent to those skilled in the art. For example, the AMD daemon 406 can process DEMs stored in each DMQ 415 in turn. That is, the process could process all DEMs stored in the first DMQ 415, move onto the second after a determination that the first DMQ 415 is empty and continue cycling through the DMQs 415 in this manner. Alternately, with multiple processors in the message distributor 401, the process can be executed simultaneously for all DMQs 415.

The IMR 502 is used to determine into which DMQ 415 a DEM should initially be placed. In the preferred embodiment, the IMR 502 applies OMR technology to determine where a fax DEM sender placed a mark on a cover sheet associated with the fax DEM. This implementation of the preferred embodiment uses Teleform Version 5 Elite (available from Cardiff Software, San Marcos, Calif.) executing on a computer, e.g., a personal computer (PC), to provide the required OMR capability. For example, if the DEM is a fax, and the sender checks a box on a fax cover sheet that indicates that the fax refers to an auto loan application, the IMR 502 determines where the check mark appeared, converts that location to an indication that auto loan processing is desired and deposits the fax as a DEM in the "autoloans" queue.

The cover sheets must be "known" for the OMR to operate accurately. That is, specialized cover sheets must be developed for each application. Alternately, customers can provide sample cover sheets that can be mapped into the AMD system 500 so that the IMR 502 can recognize them.

When a DEM arrives at the AMD system 500, the IMR 502 reads any cover sheet associated with it to attempt to determine which DMQ 415 should receive the DEM. In the preferred embodiment, this entails the IMR 502 recognizing the cover sheet and determining which check box is checked.

If the cover sheet is properly identified, the IMR 502 compares the cover sheet to a template cover sheet to determine which box is checked. When this determination is made, the IMR 502 forwards the cover sheet to the DMQ 415 corresponding to the checked box. If no box is checked, or the IMR 502 cannot determine which box is checked for some other reason, the cover sheet is forwarded to an "exception" queue for further processing, as described below.

If the IMR 502 does not recognize the cover sheet (e.g., the cover sheet is damaged, missing or improperly filled out), the incoming DEM is forwarded to an exception queue. Once in the exception queue, the DEM can be examined and properly routed manually, or automatically by an exception processor.

If the cover sheet was properly recognized but could not be further processed for some reason, it will be forwarded to a special exception queue pertaining only to DEMs having that particular cover sheet. This will facilitate subsequent forwarding by substantially narrowing the possible destination DMQs 415.

The AMD systems 400 and 500 can be implemented in numerous ways. The AMD systems of the preferred embodiment can be implemented using a computer, e.g., a personal computer or a mid-range computer, which carry out the functions described above. It would be apparent to those skilled in the art how to develop software to execute on a particular computer to implement the functions described herein. As used herein, the term computer encompasses any computer system, microprocessor, or other processor that can be used to implement the functions of the present invention. For example, a telephony company switch can be modified to implement the present invention.

The present invention can be used in a message processing center. One example of such a message processing center, which makes use of the DMQs described in FIGS. 6A and 6B, is a message center located in a financial institution. In operation, the present invention receives DEMs and automatically and optimally routes them to appropriate agents of the message processing center of the financial institution for further processing.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An automatic message distribution system, comprising:
    a computer;
    a message distributor executing on said computer to control distribution of digitally-encoded messages that are input to the automatic message distribution system;
    a resource load operatively connected to said message distributor containing resources that process said digitally-encoded messages;
    a resource information maintenance and access process operatively connected to said message distributor for storing resource information pertaining to the status of said resources;
    a distribution message queue operatively connected to said message distributor to store each of said digitally-encoded messages for distribution; and
    a distribution rule maintenance and application process connected to said message distributor to store distribution rules for distributing said digitally-encoded messages to said resources from said distribution message queue in accordance with said resource information.

2. The automatic message distribution system of claim 1, wherein said message distributor further comprises:
    an automatic message distribution daemon to control distribution of said digitally-encoded messages to said resources.

3. The automatic message distribution system of claim 2, further comprising a configuration file to store parameters that are used by said daemon to control distribution of said digitally-encoded messages.

4. The automatic distribution system of claim 3, wherein said resources are users of the automatic message distribution system.

5. The automatic message distribution system of claim 4, wherein said configuration file comprises a primary user list having at least one entry corresponding to a primary user of said distributed message queue.

6. The automatic message distribution system of claim 5, wherein said configuration file comprises a secondary user list having at least one entry corresponding to a secondary user of said distributed message queue.

7. The automatic message distribution system of claim 3, further comprising at least one additional distribution message queue.

8. The automatic message distribution system of claim 7, wherein said configuration file stores parameters corresponding to each distribution message queue in said automatic message distribution system.

9. The automatic message distribution system of claim 7, further comprising an additional configuration file corresponding to each said additional distribution queue.

10. The automatic distribution system of claim 7, further comprising an input message router to initially route the digitally-encoded messages to one of said distribution queues.

11. The automatic message system of claim 2, wherein said distribution message queue comprises:
    a high-priority queue;
    a low-priority queue; and
    an age value indicating the age of any of said digitally-encoded messages, wherein said age is determined by subtracting the time that the fax entered the automatic message system from the current time.

12. The automatic message distribution system of claim 11, further comprising one or more additional priority levels and one or more additional priority queues corresponding to each of said one or more additional priority levels.

13. The automatic message distribution system of claim 1, wherein said resource information maintenance and access process comprises a resource information table to store said resource information.

14. The automatic message distribution system of claim 1, wherein said distribution rule maintenance and application process comprises a distribution rule table to store said distribution information.

15. A method for automatically distributing digitally-encoded messages that are input to an automatic message distribution system that includes a resource load containing a plurality of resources, comprising the steps of:
    (a) storing each of said digitally-encoded messages in one or more distributed message queues;
    (b) storing resource information concerning said resources in a resource information table that enables the automatic message distribution system to determine which of said resources is available to a digitally-encoded message stored in said one or more distributed message queues;
    (c) storing a set of routing rules in a distribution routing table that control distribution of said digitally-encoded message to the resources; and
    (d) automatically routing a digitally-encoded message stored in said one or more distributed message queues.

16. The method of claim 15, further comprising the step of creating a system configuration file corresponding to the automatic message distribution system to store parameters that control system performance.

17. The method of claim 15, further comprising the steps of:
    creating a primary user list of at least one primary user for each of said one or more distributed message queues; and
    storing said primary list in said system configuration file.

18. The method of claim 17, further comprising the steps of
    creating a secondary user list of at least one secondary user for each of said one or more distribute message queues; and
    storing said secondary user list in said system configuration file.

19. A The method claim 15, further comprising the steps of:
    (e) analyzing each of said digitally-encoded messages to determine into which of said one or more distributed message queues said digitally-encoded messages should be stored; and
    (f) storing each of said digitally-encoded messages in a distributed message queue that is determined in accordance with step (e).

20. The method of claim 19, wherein said analyzing step (e) comprises the steps of:

(i) analyzing a cover sheet associated with each digitally-encoded message to determine whether a box has been checked; and (ii) providing the information derived in the analyzing step (i) to the storing step (f) so that each digitally-encoded message is stored in an appropriate one of said one or more distributed message queues.

21. The method of claim 20, wherein step (i) comprises the step of analyzing a cover sheet associated with each DEM to determine whether a box has been checked.

22. A message processing center, comprising:

a plurality of agents to process digitally-encoded messages input to the message processing center; and an automatic message processing system, comprising:

a message distributor having a daemon executing thereon to optimally route said digitally-encoded messages to said agents;

one or more distributed message queues for storing each of said digitally-encoded messages;

a resource information table to determine the availability of said agents so that the automatic message processing system can determine an optimal routing of said digitally-encoded messages to said agents; and a distribution rule table to store distribution rules that are used by said automatic message distribution system to optimally route said digitally-encoded messages from said one or more distributed message queues to said agents.

23. The message processing center of claim 22, wherein said automatic message distribution system further comprises an input message router to route each of said digitally-encoded messages to an appropriate one of the one or more distributed message queues.

* * * * *